No. 856,658. PATENTED JUNE 11, 1907.
F. D. PARSONS.
NUT LOCK.
APPLICATION FILED JULY 11, 1906.
Fig. 1.
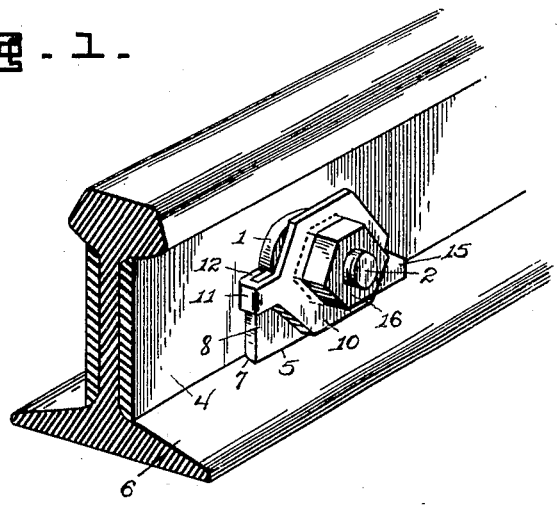
Fig. 2.     Fig. 3.     Fig. 4.
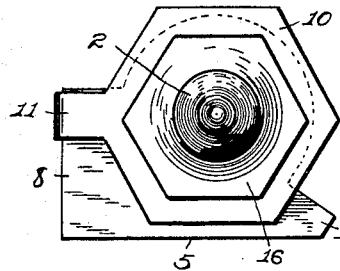 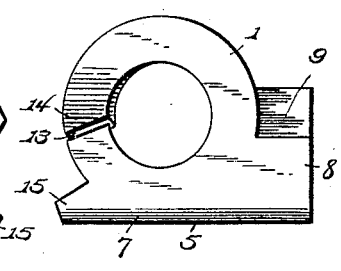 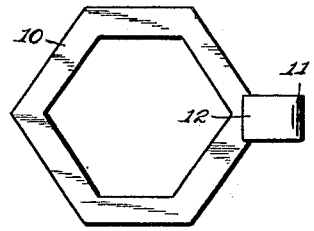
Fig. 5.     Fig. 6.
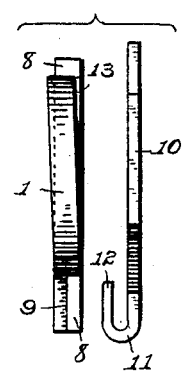 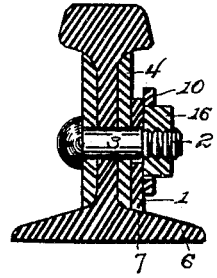
WITNESSES:
Robt F Dilworth
INVENTOR
Fred D. Parsons
By H. E. Dunlap
ATTORNEY

UNITED STATES PATENT OFFICE.

FREDERICK D. PARSONS, OF HAMMONDSVILLE, OHIO.

NUT-LOCK.

No. 856,658.     Specification of Letters Patent.     Patented June 11, 1907.

Application filed July 11, 1906. Serial No. 325,741.

*To all whom it may concern:*

Be it known that I, FREDERICK D. PARSONS, a citizen of the United States of America, and a resident of Hammondsville, county of Jefferson and State of Ohio, have invented certain new and useful Improvements in Nut-Locks, of which the following is a specification.

My invention relates to new and useful improvements in nut-locks, and it consists in the particular construction, arrangement and combination of parts which will hereinafter be fully described.

The object of the invention is to provide a simple, cheap and efficient device for positively locking nuts against retraction on their bolts.

A further object is to provide a nut-lock which is adapted for application to an ordinary nut and bolt without alteration being made in said nut or bolt, which may be conveniently mounted in place, and which may be readily removed when occasion requires without mutilation of the threads or other injury to either the nut or bolt.

In describing the invention in detail, reference is herein had to the accompanying drawings, forming a part of this specification, in which—

Figure 1 is a perspective view of the invention applied to a nut at a rail-joint; Fig. 2 is an end elevation of the invention applied to a nut; Fig. 3 is a rear face view of the washer; Fig. 4 is a similar view of the nut-embracing ring; Fig. 5 illustrates upper edge views of the washer and nut-embracing ring respectively; and Fig. 6 is a cross section of a railway-rail showing the invention applied thereto in vertical section.

Referring to said drawings, in which like reference-numerals designate like parts throughout the several views—1 indicates a washer adapted for freely slipping over the threaded end 2 of a bolt 3 against the fish-plate 4. The upper part of said washer is substantially semi-circular in form, and has its lower part extended to form a longitudinal horizontal base 5 for resting upon the top of the rail-base 6. Said base 5 is slightly beveled, as shown at 7, to conform to the angle of inclination of the top of said rail-base. Said washer has also a lateral extension 8 which is recessed on its rear face, forming a pocket 9, the purpose of which will presently be made apparent.

When the nut 16 has been tightened up against the face of the washer 1, a nut-embracing ring 10, preferably polygonal in shape and having a polygonal opening therethrough, is slipped over said nut close against said washer. Said ring carries on its outer edge an integral lateral extension which is bent to form a hook 11, the bill 12 of which lies substantially parallel to the body thereof. Said ring is slipped over said nut so that the hook 11 lies inclined upward at an angle to the plane of the rail base after which the nut 16 is turned back, carrying the ring therewith, until the bill 12 of said hook drops into the pocket 9 which is provided therefor in the rear face of the extension 8 of said washer, as hereinbefore mentioned. In this position the nut is positively held against further retraction, the nut-embracing ring and the washer being interlocked.

It will be noted that the washer 1 is split at a suitable point in the semi-circular portion thereof, as at 13, and that the end 14 of the longer member of said semi-circular portion is sprung rearwardly, forming a yieldable bearing for engaging the fish-plate 4, said yieldable bearing being provided for the purpose of taking up such slack as may be created by wear of the bolt or by the retraction of the nut necessary to bring the hook 11 into engagement with the pocket 9.

A heel 15 is preferably provided on the end of the base extension 5 opposite the lateral extension 8, thus providing a longer bearing surface for said washer for engagement with the rail-base 6.

I have described my invention more or less in detail, and in what I consider to be its simplest form, but it is obvious that various slight changes and alterations may be made in the construction and arrangement of parts without departing from the general spirit or scope thereof. Hence I do not desire to limit myself to the precise construction and arrangement of parts herein shown and described.

Having thus described my invention, what I claim as new, and desire to secure by Letters Patent, is—

1. A nut-lock consisting of a washer having a horizontal extended base adapted for bearing engagement with the top of a rail-base, a lateral extension carried by said washer, a pocket in the rear face of said extension, a nut-embracing ring adapted for slipping over a nut when the latter has been adjusted to position against the face of said washer, and a hook carried by said ring, said hook being adapted for entering the pocket in the washer upon a slight backward rotation of the nut.

2. A nut-lock consisting of a washer having a horizontal extended base adapted for bearing engagement with the top of a rail-base, a lateral extension carried by said washer, a pocket in the rear face of said extension, a ring having a polygonal opening therein and adapted for embracing a polygonal nut, and a hook carried by said ring, said hook being adapted for entering said pocket when the nut to which the ring is applied is turned rearwardly for interlocking said ring and washer.

3. In a nut-lock, a split washer having one of its ends sprung rearwardly for yielding engagement with a railway fish-plate, a horizontal base carried by said washer for bearing engagement with the top of the rail-base, a lateral extension carried by said washer, said lateral extension having a recessed pocket therein on its rear face, and a nut-embracing ring having a hook adapted for interlocking engagement with said pocket.

In testimony whereof I affix my signature in presence of two subscribing witnesses.

FREDERICK D. PARSONS.

Witnesses:
 ALBERT R. POTTS,
 FRED McBANE.